(12) United States Patent
Fang et al.

(10) Patent No.: US 11,715,186 B2
(45) Date of Patent: Aug. 1, 2023

(54) MULTI-IMAGE-BASED IMAGE ENHANCEMENT METHOD AND DEVICE

(71) Applicant: TSINGHUA UNIVERSITY, Beijing (CN)

(72) Inventors: Lu Fang, Beijing (CN); Yinheng Zhu, Beijing (CN); Qionghai Dai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 312 days.

(21) Appl. No.: 17/036,493

(22) Filed: Sep. 29, 2020

(65) Prior Publication Data

US 2021/0097648 A1   Apr. 1, 2021

(30) Foreign Application Priority Data

Sep. 30, 2019   (CN) .......................... 201910945317.5

(51) Int. Cl.
| | |
|---|---|
| *G06K 9/36* | (2006.01) |
| *G06T 5/50* | (2006.01) |
| *G06N 3/08* | (2023.01) |
| *G06T 3/40* | (2006.01) |
| *G06T 9/00* | (2006.01) |
| *G06F 18/25* | (2023.01) |
| *G06V 10/764* | (2022.01) |
| *G06V 10/80* | (2022.01) |
| *G06V 10/82* | (2022.01) |
| *G06V 10/44* | (2022.01) |

(52) U.S. Cl.
CPC .............. *G06T 5/50* (2013.01); *G06F 18/253* (2023.01); *G06N 3/08* (2013.01); *G06T 3/4053* (2013.01); *G06T 9/00* (2013.01); *G06V 10/454* (2022.01); *G06V 10/764* (2022.01); *G06V 10/806* (2022.01); *G06V 10/82* (2022.01); *G06T 2207/20084* (2013.01); *G06T 2207/20221* (2013.01)

(58) Field of Classification Search
CPC ........ H04N 7/50; H04N 7/30; H04N 7/26244; H04N 7/26313; H04N 7/26079; H04N 7/26563; H04N 7/26579; H04N 7/26393; H04N 7/2651; H04N 19/176; H04N 19/186; H04N 19/196; H04N 19/132; H04N 19/14; G06K 9/645; G06K 9/6202; G06K 9/03; G06K 9/20; G06K 9/32; G06T 9/007; G06T 9/00; G06T 3/40; H03M 7/30; H03M 7/4031; H03M 7/6011; H03M 7/6094
See application file for complete search history.

(56) References Cited

U.S. PATENT DOCUMENTS

| | | | |
|---|---|---|---|
| 2013/0208942 A1* | 8/2013 | Davis ................... | H04N 19/14 382/100 |
| 2019/0180136 A1* | 6/2019 | Bousmalis ........... | G06N 3/0454 |
| 2021/0166346 A1* | 6/2021 | Kim ..................... | H04N 19/164 |

\* cited by examiner

*Primary Examiner* — Duy M Dang
(74) *Attorney, Agent, or Firm* — David D. Brush; Westman, Champlin & Koehler, P.A.

(57) ABSTRACT

The present disclosure provides a multi-image-based image enhancement method and device, an electronic device and a non-transitory computer readable storage medium. The method includes: aligning a low-resolution target image and a reference image in an image domain; performing, an alignment in a feature domain; and synthesizing features corresponding to the low-resolution target image and features corresponding to the reference image to generate a final output.

19 Claims, 5 Drawing Sheets

(a) Flower 4×

(b) LFVideo 4×

(c) Flower 8×

(d) LFVideo 8×

MULTI-IMAGE-BASED IMAGE ENHANCEMENT METHOD AND DEVICE

CROSS REFERENCE TO RELATED APPLICATION

This application claims priority and benefits to Chinese Application No. 201910945317.5, filed on Sep. 30, 2019, the entire content of which is incorporated herein by reference.

TECHNICAL FIELD

The present disclosure relates to the field of computational photography technology, and more particularly, to a multi-image-based image enhancement method and a multi-image-based image enhancement device.

BACKGROUND

A single-image-based super-resolution method refers to a method for enhancing a low-resolution image of a specified field of view, without using an input from a sensor having another field of view. An existing single-image-based super-resolution method, such as a super-resolution method based on deep learning, like MDSR (multi-scale deep super-resolution) system, is mainly to train a mode based on some network structures and supervisory signals.

SUMMARY

Embodiments of the present disclosure provide a multi-image-based image enhancement method. The method includes: aligning a low-resolution target image and a reference image in an image domain; performing an alignment in a feature domain; and synthesizing features corresponding to the low-resolution target image and features corresponding to the reference image to generate a final output.

Embodiments of the present disclosure provide an electronic device. The electronic device includes one or more processors; and a memory configured to store one or more programs. When the one or more programs are executed by the one or more processors, the one or more processors are caused to perform the multi-image-based image enhancement method according to above embodiments of the present disclosure.

Embodiments of the present disclosure provide a computer readable storage medium, having computer programs stored thereon. When the computer programs are executed by a processor, the processor is configured to execute the multi-image-based image enhancement method according to above embodiments of the present disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
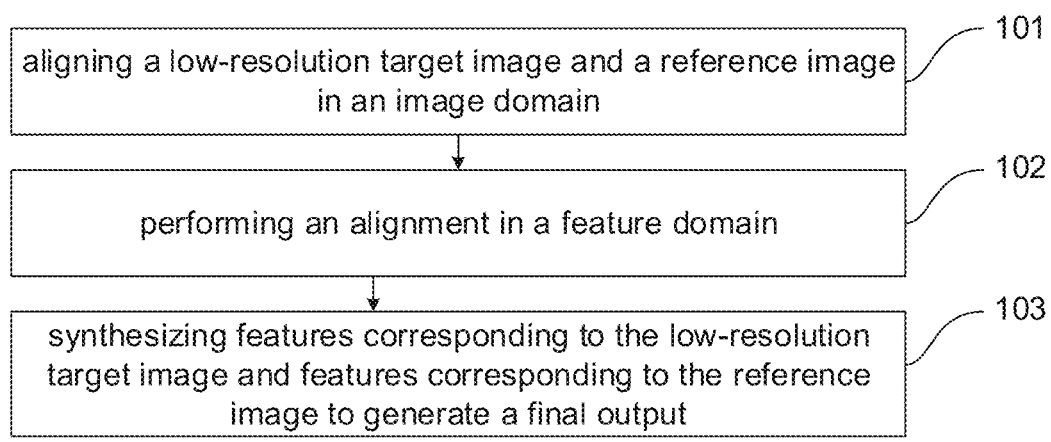
FIG. 1 is a flowchart illustrating a multi-image-based image enhancement method according to embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

A single-image-based super-resolution method refers to a method for enhancing a low-resolution image of a specified field of view, without using an input from a sensor having another field of view. An existing single-image-based super-resolution method, such as a super-resolution method based on deep learning, like MDSR (multi-scale deep super-resolution) system, is mainly to train a mode based on some network structures and supervisory signals.

In related arts, other multi-image-based super-resolution methods exist. A difference among those methods is in synthesizing inputs from multiple sensors to generate a final result. For example, a method like PatchMatch is to align the images from multiple sensors based on region matching and perform reconstruct based on the aligned images.

However, the methods in related arts may have following disadvantages. The single-image-based super-resolution method is ineffective under resolution scales of 4 and 8 multiples. With the region matching, aligned images generated the PatchMatch may have grid noise. Further, time efficiency is low. The existing methods provide poor performance on real data or data provided by sensors having a large disparity.

Therefore, the present disclosure provides a multi-image-based image enhancement method, a multi-image-based image enhancement device, an electronic device and non-transitory computer readable storage medium.

FIG. 1 is a flowchart illustrating a multi-image-based image enhancement method according to embodiments of the present disclosure.

As illustrated in FIG. 1, the multi-image-based image enhancement method may include the following.

A low-resolution target image and a reference image are aligned 101 in an image domain.

Figure 2:
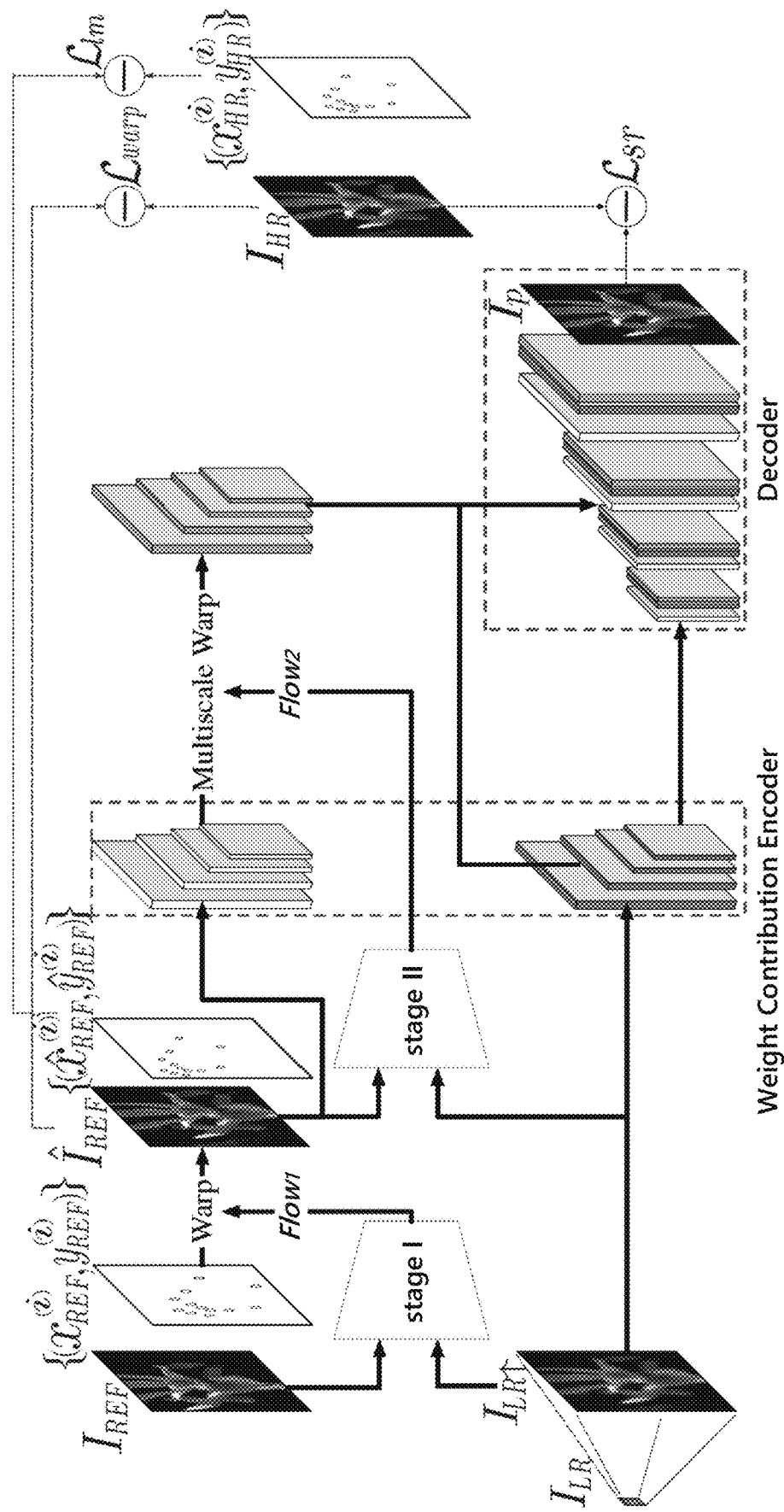
FIG. 2 is a flowchart illustrating a multi-image-based image enhancement method according to embodiments of the present disclosure.

It can be understood that, as illustrated in FIG. 2, a two-stage multi-scale alignment may be realized alignment module. In a first-stage multi-scale alignment process, the low-resolution target image and the reference image may be aligned in the image domain to obtain the evaluation of the aligned reference image.

In an example, aligning the low-resolution target image and the reference image may include obtaining an optical flow field and aligning the low-resolution image and the reference image based on optical flow field.

Generally, the optical flow field may be calculated by a following equation: V=Flow($I_1$, $I_2$), where V indicates the optical flow field, $I_1$ indicates the low-resolution target image and $I_2$ indicates the reference image. In an example, in a case where the optical flow field is calculated in an image domain, $I_1$ and $I_2$ may be images. In another example, in a case where the optical flow field is calculated in a feature domain, $I_1$ and $I_2$ may be feature maps.

In embodiments of the present disclosure, a multi-scale down-sampling operation may be performed on the low-resolution target image to obtain multi-scale and down-sampled target images. Based on the multi-scale and down-sampled target images and the reference image, the optical flow field under each scale may be obtained in the image domain.

In detail, the first optical flow fields may be calculated in the image domain based on a following equation (1).

$$\{V^3, V^2, V^1, V^0\} = \text{Flow}(I_1, I_2) \qquad (1)$$

where, $V^3$, $V^2$, $V^1$, $V^0$ are first optical flow fields obtained for performing the alignment in the image domain under four scales of down-sampling of 3, 2, 1, 0 respectively, $I_1$ is the down-sampled target image under each scale of down-sampling and $I_2$ is the reference image. In an example, the four scales of down-sampling of 3, 2, 1, 0 correspond to down-sampling by $2^3$, $2^2$, $2^1$ and $2^0$ multiples respectively. In addition, in a case where the optical flow field is calculated in the image domain, both $I_1$ and $I_2$ may be images. In a case where the optical flow field is calculated in a feature domain, both $I_1$ and $I_2$ may be feature maps.

In detail, a multi-scale structure is proposed based on the network of the FlowNetS. The first optical flow fields are calculated based on feature maps under the several scales of down-sampling of 3, 2, 1, and 0 respectively. For example, the first optical flow fields are calculated based on the above equation (1). For example, in the above equation (1), depending on whether the optical flow fields are calculated based on images or feature maps, $I_1$ and $I_2$ may be images or feature maps respectively.

In the first stage, in the image domain, with a first optical flow field prediction $\text{Flow}_1$, an estimation of the optical flow field under the scale of down-sampling of 0 multiple, may be represented by a following equation: $V_1^0 = \text{Flow}_1(I_{LR}, I_{REF})$, where $I_{REF}$ refers to the reference image, $I_{LR}$ refers to the low-resolution target image.

Based on the estimation $V_1^0$ of the first optical flow field, an estimation $\hat{I}_{REF}$ of the reference image after the alignment in the image domain may be obtained. Further, by performing an up-sampling operation on the low-resolution target image $I_{LR}$ with a method of single-image super-resolution (SISR), an up-sampled target image $I_{LR\uparrow}$ may be obtained, i.e., $I_{LR\uparrow} = \text{SISR}(I_{LR})$.

An alignment is performed 102 in a feature domain.

It can be understood that, as illustrated in FIG. 2, in a second-stage multi-scale alignment process, the alignment is performed in the feature domain.

In detail, in the second stage, the estimation $\hat{I}_{REF}$ of the aligned reference image and down-sampled images of the up-sampled target image $I_{LR\uparrow}$ may be used as inputs of a second optical flow field prediction $\text{Flow}_2$. The second optical flow fields for aligning feature maps in an encoder and decoder may be obtained by a following equation (2), which is similar to the equation (1) in the first stage:

$$\{V_2^3, V_2^2, V_2^1, V_2^0\} = \text{Flow}_2(I_{LR\uparrow}, \hat{I}_{REF}) \qquad (2)$$

where, $V_2^3$, $V_2^2$, $V_2^1$, $V_2^0$ are second optical flow fields obtained for performing the alignment in the feature domain under four scales of down-sampling of 3, 2, 1, 0 respectively, and $I_{LR\uparrow}$, $\hat{I}_{REF}$ are inputs of the optical flow field prediction $\text{Flow}_2$ in the second stage.

For each scale, features corresponding to the low-resolution target image and features corresponding to the reference image are synthesized 103 to generate a final output.

It can be understood that, as illustrated in FIG. 2, a multi-scale encoder and decoder may be used in the feature domain. The multi-scale encoder and decoder may be configured to synthesize the features corresponding to the low-resolution target image and the features corresponding to the reference image, for each scale, to generate a final output, i.e., an enhanced image.

In embodiments of the present disclosure, synthesizing the features corresponding to the low-resolution target image and the features corresponding to the reference image, for each scale, to generate the final output may include: encoding aligned feature maps, for each scale, using an encoder, like the U-Net encoder; and for each scale, synthesizing the features corresponding to the reference image, features corresponding to the low-resolution target image and outputs from a previous layer of the encoder on a channel dimension.

In detail, four second optical flow fields may be obtained respectively under four scales. Based on the four second optical flow fields of the four scales, feature maps are aligned in the feature domain under respective scales. The feature maps aligned under the four scales may be encoded by an encoder, like the U-Net encoder. The encoder includes five convolutional layers. Each convolutional layer includes 64 convolution kernels of size 5_5. The first two layers are used to extract feature maps of the low-resolution target image and the reference image under the scale of 0, i.e., $2^0$ multiples, while the other three layers are used to respectively extract feature maps of the low-resolution target image and the reference image under the sale of i, (0<i≤3), i.e., the $2^i$ multiples.

Generally, operations of encoding may be represented by the following equation (2) and (3):

$$F^{(0)} = \sigma(W^{(0)} * I + b^{(0)}) \qquad (2)$$

$$F^{(i)} = \sigma(W^{(i)} * F^{(i-1)} + b^{(i)}) \Downarrow_2, i=1,2,3 \qquad (3)$$

where, $F^{(0)}$ indicates the feature map of the scale of 0, $F^{(i)}$ indicates the feature map of the scale of i, $\sigma$ is a ReLU function, an operator * refers to convolution operation I indicates the aligned reference image or the aligned target images.

Based on the above equations (2) and (3), the feature map $F_{REF}^{(i)}$ of each scale i may be obtained for the reference image, and the feature map $F_{LR}^{(i)}$ of each scale i may be obtained for the low-resolution target image. Further, based on the feature map $F_{REF}^{(i)}$ of the reference image and the optical flow field $V_2^{(i)}$, an estimation $\hat{F}_{REF}^{(i)}$ of the feature map of the reference image may be obtained, which may be represented as $\hat{F}_{REF}^{(i)} = \text{warp}(F_{REF}^{(i)}, V_2^{(i)})$, i=0,1,2,3.

In the decoder, for the feature map under the scale of i, features corresponding to the reference image, features corresponding to the low-resolution target image and outputs from a previous layer of the encoder are synthesized on a channel dimension.

For example, operations of decoder may be represented by the following equations (4) and (5):

$$F_D^{(3)} = \sigma(W_D^{(3)} * (F_{LR}^{(3)}, \hat{F}_{REF}^{(3)}) + b_d^{(3)}) \qquad (4)$$

$$F_D^{(i)} = \sigma(W_D^{(i)} * (F_{LR}^{(i+1)}, \hat{F}_{REF}^{(i+1)}) + b_D^{(i)}), i=2,1,0 \qquad (5)$$

where, $F_{LR}^{(i+1)}$ indicates the feature map under the scale of (i+1) for the low-resolution target image, $\hat{F}_{REF}^{(i+1)}$ indicates the estimation of the feature map under the scale of (i+1) for the reference image.

After the features corresponding to the low-resolution target image, the features corresponding to the reference image, and the outputs from the previous layer of the encoder are synthesized, three convolutional layers having the convolution kernel size of 5*5 and a channel number of {64, 64, 3} are used to adjust the final output to obtain a super-resolution result Ip.

In embodiments of the present disclosure, the method according to embodiments of the present disclosure may further include: determining at least one of alignment error, reconstruction error, and feature point error as a loss function.

It can be understood that, at least one of the alignment error, the reconstruction error, and the feature point error may be used as the loss function.

The alignment error will be described below.

In the first stage, a self-supervised learning method may be used to constrain an estimation of the generated optical flow field. Since the input images (including the reference image and the low-resolution target image) corresponding to similar angles of view, the aligned reference image may have a similar intensity distribution to the low-resolution target image. Therefore, the alignment loss may be defined as follows:

$$L_{warp} = 1/2 \Sigma_i^N \Sigma_s |\hat{I}_{REF}^{(i)}(s) - I_{HR}^{(i)}(s)|_2^2 \quad (6)$$

where, $L_{warp}$ indicates the alignment loss, N indicates the number of samples of a training set, i indicates the scale of down-sampling, j indicates a sample, and s indicates the angle of view, and $I_{HR}^{(i)}(s)$ indicates a real result, where j traverses the training set and s traverses the angle of views of the sample in the training set.

The feature point error will be described below.

Feature points are used to indicate a precise position transformation relation obtained by a conventional method, which may be used as an important determination basis and guidance for the network to learn the optical flow field. Therefore, a classical feature point detection method is used to obtain a set of feature points corresponding to the reference image and the low-resolution target image. Feature points of top 64 sets of confidence after the alignment are determined as:

$$(\hat{x}_{REF}^{(i)}, \hat{y}_{REF}^{(i)}) = \text{warp}((x_{REF}^{(i)}, y_{REF}^{(i)}), V_1^{(0)}) \quad (7)$$

where, i indicates the scale of down-sampling.

The reconstruction error, also called super-resolution reconstruction error, will be described below.

The super-resolution reconstruction error is to realize a final goal, i.e., optimizing accuracy of the super-resolution result. Given the prediction $I_p$ and a real result $I_{HR}$, the reconstruction error may be defined as:

$$L_{sr} = \frac{1}{N} \sum_i^N \sum_s \rho(I_{HR}^{(i)}(s) - I_p^{(i)}(s)) \quad (8)$$

where, $L_{sr}$ indicates the reconstruction error, i indicates the scale of down-sampling, N indicates the number of samples in the training set, j indicates the sample included in the training set, s indicates the angle of view.

Figure 3A:
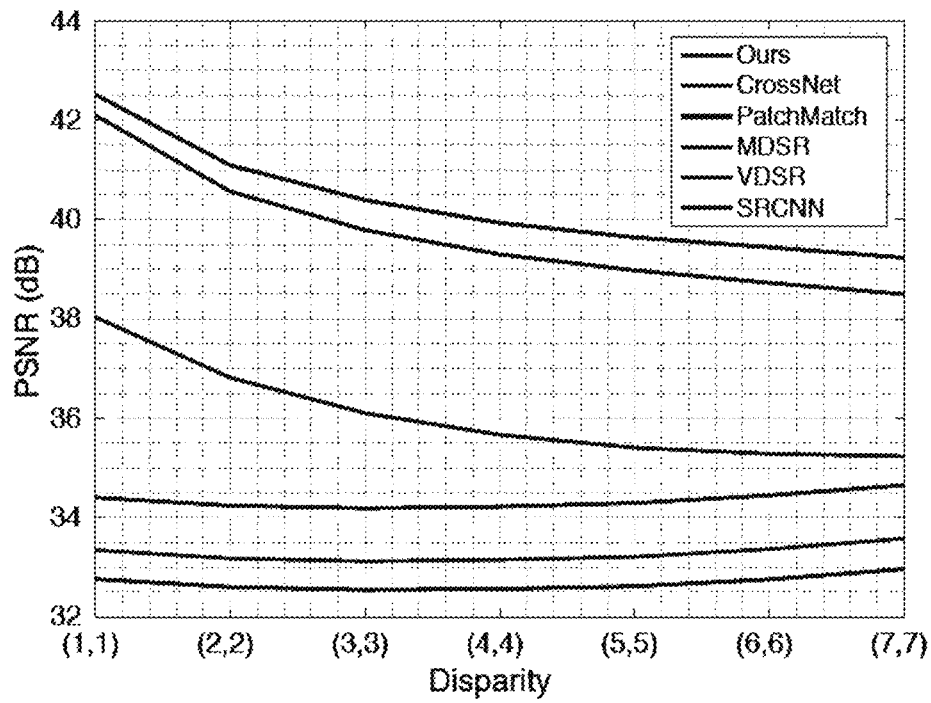
FIG. 3A is a diagram illustrating a relation between PSNR (peak signal to noise ratio) and disparity according to embodiments of the present disclosure.
Figure 3A:
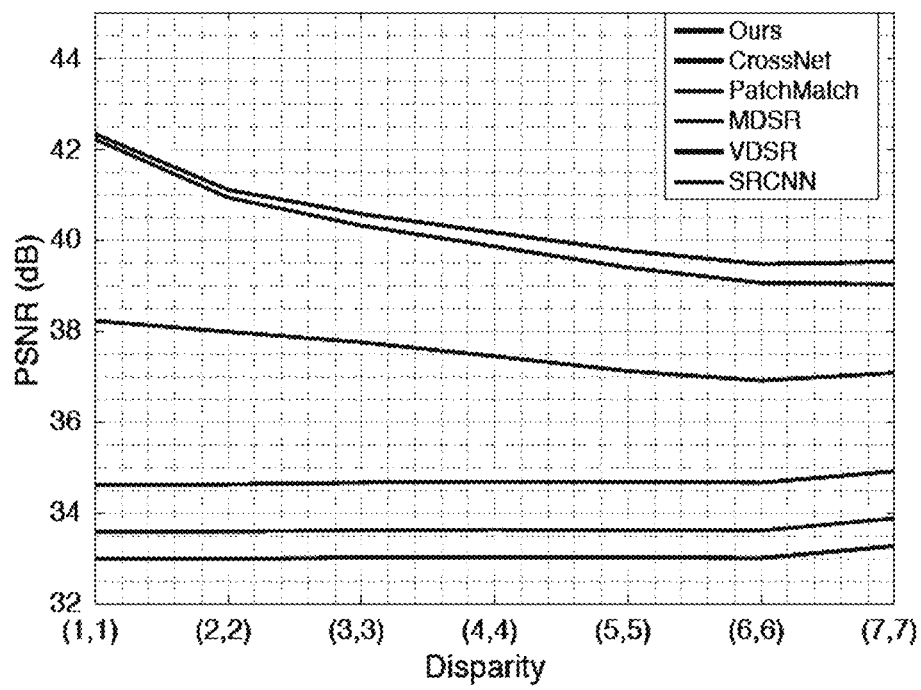
Figure 3B:
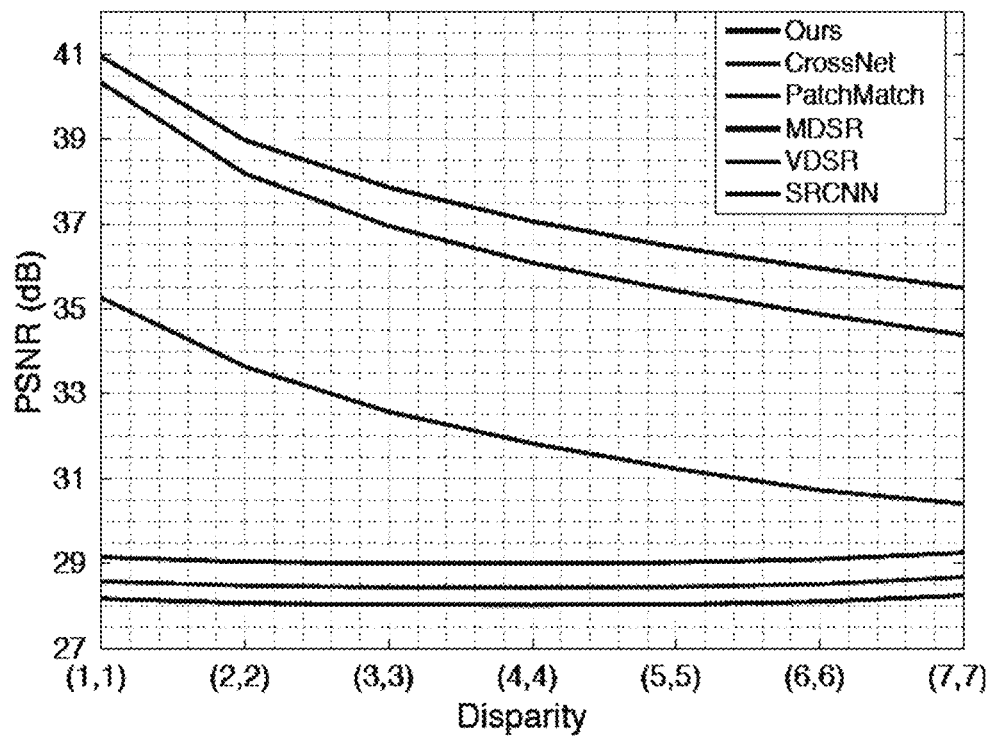
FIG. 3B is another diagram illustrating a relation between PSNR (peak signal to noise ratio) and disparity according to embodiments of the present disclosure.
Figure 3B:
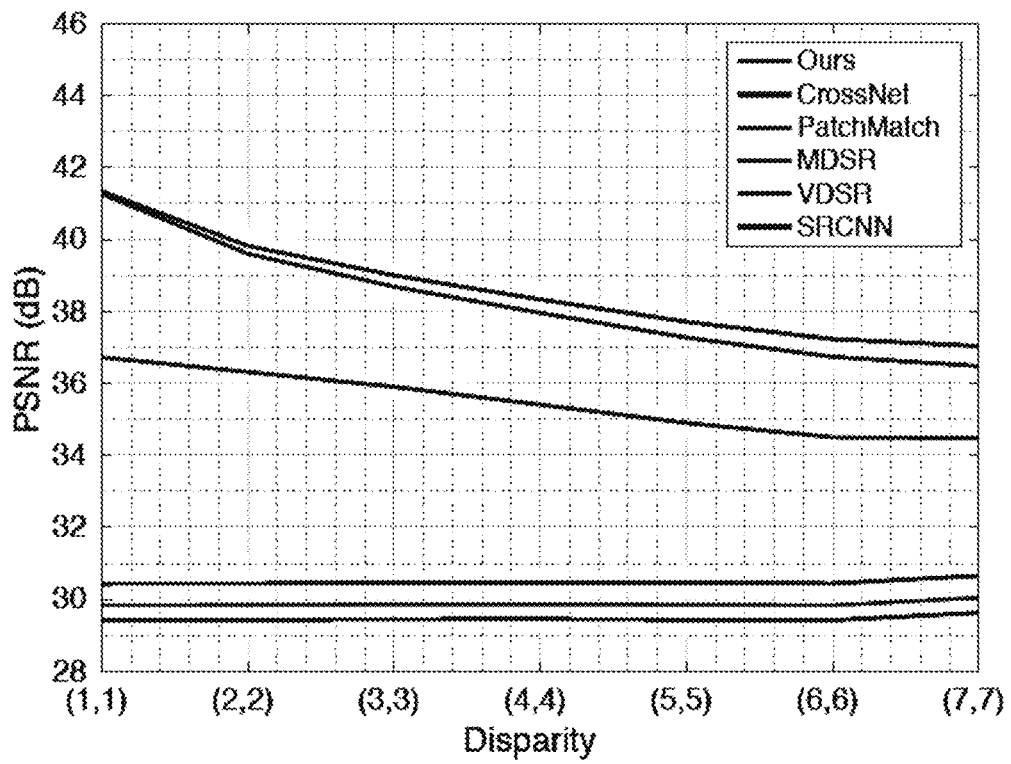

Performance of multiple methods on different evaluation dimensions PSNR (peak signal to noise ratio), SSIM (structural similarity index) and IFC (information fidelity criterion) are shown in Table 1, under the scale of 4 and 8 multiples respectively. Further, a relation between PSCN and disparity is illustrated in FIG. 3A and FIG. 3B, where the angle of view of the reference image is (0, 0), while the angle of view of the low-resolution target image for generating the super-resolution image is (i, i), where 0<i≤7.

TABLE 1

| Methods | Scale | Flower (1,1) | | | Flowers (7,7) | | | LFVideo (1,1) | | | LFVideo (7,7) | | |
|---|---|---|---|---|---|---|---|---|---|---|---|---|---|
| | | PSNR | SSIM | IFC | PSNR | SSIM | IFC | PSNR | SSIM | IFC | PSNR | SSIM | IFC |
| SRCNN[35] | 4× | 32.76 | 0.89 | 2.46 | 32.96 | 0.90 | 2.49 | 32.98 | 0.86 | 2.07 | 33.27 | 0.86 | 2.08 |
| VDSR[37] | 4× | 33.34 | 0.90 | 2.73 | 33.58 | 0.91 | 2.76 | 33.58 | 0.87 | 2.29 | 33.87 | 0.88 | 2.30 |
| MDSR[57] | 4× | 34.40 | 0.92 | 3.04 | 34.65 | 0.92 | 3.07 | 34.62 | 0.89 | 2.62 | 34.91 | 0.90 | 2.63 |
| PatchMatch[2] | 4× | 38.03 | 0.97 | 5.11 | 35.23 | 0.94 | 3.85 | 38.22 | 0.95 | 4.60 | 37.08 | 0.94 | 3.99 |
| CrossNet[5] | 4× | 42.09 | 0.98 | 6.70 | 38.49 | 0.97 | 5.02 | 42.21 | 0.98 | 5.96 | 39.03 | 0.96 | 4.61 |
| ours | 4× | 42.51 | 0.98 | 6.99 | 39.23 | 0.97 | 5.52 | 42.33 | 0.97 | 6.15 | 39.52 | 0.96 | 5.03 |
| SRCNN[35] | 8× | 28.17 | 0.77 | 0.98 | 28.25 | 0.77 | 1.00 | 29.43 | 0.75 | 0.82 | 29.63 | 0.76 | 0.82 |
| VDSR[37] | 8× | 28.58 | 0.78 | 1.04 | 28.68 | 0.78 | 1.06 | 29.83 | 0.77 | 0.89 | 30.04 | 0.77 | 0.89 |
| MDSR[57] | 8× | 29.15 | 0.79 | 1.17 | 29.26 | 0.80 | 1.19 | 30.43 | 0.78 | 1.04 | 30.65 | 0.79 | 1.05 |
| PatchMatch[2] | 8× | 35.26 | 0.95 | 4.00 | 30.41 | 0.85 | 2.07 | 36.72 | 0.94 | 3.81 | 34.48 | 0.91 | 2.84 |
| SS-Net[1] | 8× | 37.46 | 0.97 | 4.72 | 32.42 | 0.91 | 2.95 | 37.93 | 0.95 | 4.06 | 35.81 | 0.93 | 3.30 |
| CrossNet[5] | 8× | 40.31 | 0.98 | 5.74 | 34.37 | 0.93 | 3.45 | 41.26 | 0.97 | 5.22 | 36.48 | 0.93 | 3.43 |
| ours | 8× | 40.94 | 0.98 | 6.09 | 35.49 | 0.94 | 4.06 | 41.34 | 0.97 | 5.38 | 37.04 | 0.94 | 3.81 |

It should be noted that, the method according to embodiments of the present disclosure is also applicable for a super-resolution video. That is, given a high-resolution image from a video, it may be desired to reconstruct a low-resolution image.

In conclusion, a method of estimating the optical flow fields to align inputs from multiple sensors and synthesizing the feature maps is used. Further, a method of gradually reducing the disparity by multiple alignments is used. In the feature domain, inputs from the sensors are synthesized. Three supervisory signals are used with the supervision of the network learning. Compared with the single-image super-resolution method, the performance is higher and visual effect is better. Moreover, compared with the Patch-Match method, the speed is improved, and no grid noise occurs. Furthermore, compared with other alignment and synthesis methods, the alignment in the feature domain and the direct supervisory signals allow good convergence effect and high output performance.

According to the multi-image-based image enhancement method according to embodiments of the disclosure, the neural network is used to estimate the optical flow fields among different inputs from sensors. The optical flow field is used for aligning multi images from sensors and feature maps. The aligned images and aligned feature maps are input into the neural network for reconstruction to obtain the output, thereby having good performance, good visual effect, and high speed, without grid noise. Further, the alignment in the feature domain and the direct supervisory signals allow good convergence effect and good output performance.

Further, a multi-image-based image enhancement device according to embodiments of the present disclosure will be described with reference to the accompanying drawings.

Figure 4:
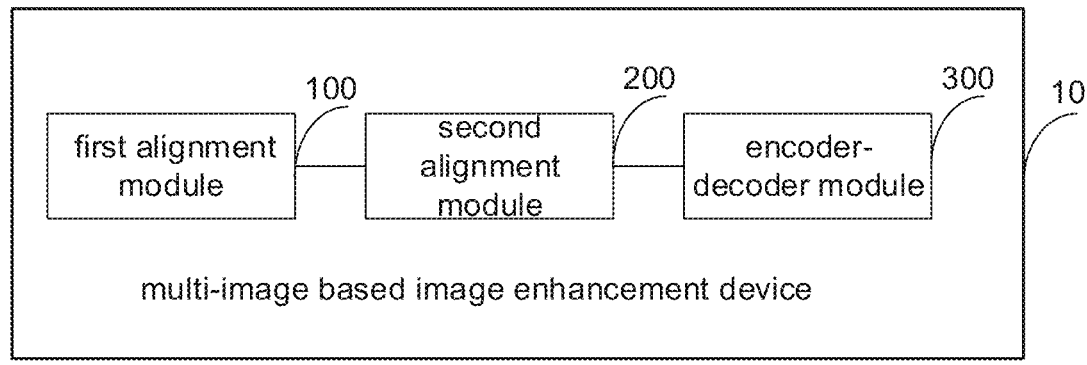
FIG. 4 is a schematic diagram illustrating a multi-image-based image enhancement device according to embodiments of the present disclosure.

FIG. 4 is a schematic diagram illustrating a multi-image-based image enhancement device according to embodiments of the present disclosure.

As illustrated in FIG. 4, the multi-image-based image enhancement device 10 may include a first alignment module 100, a second alignment module 200, and an encoder-decoder module 300.

The first alignment module 100 may be configured to align a low-resolution target image and a reference image in an image domain. The second alignment module 200 may be configured to perform an alignment in a feature domain. The encoder-decoder module 300 may be configured to synthesize features corresponding to the low-resolution target image and features corresponding to the reference image to generate a final output.

The device 10 may allow good performance, good visual effect, and high speed, without grid noise. Further, the alignment in the feature domain and the direct supervisory signals may allow good convergence effect and good output performance.

In an example, the first alignment module 100 may be configured to obtain first optical flow fields based on a following equation:

$$\{V^3, V^2, V^1, V^0\} = \mathrm{Flow}(I_1, I_2)$$

where, $V^3$, $V^2$, $V^1$, $V^0$ are first optical flow fields obtained for performing the alignment in the image domain under four scales of down-sampling of 3, 2, 1, 0 respectively, $I_1$ is the down-sampled target image under each scale of down-sampling and $I_2$ is the reference image.

The second alignment module may be configured to obtain second optical flow fields for aligning feature maps based on a following equation:

$$\{V_2^3, V_2^3, V_2^1, V_2^0\} = \mathrm{Flow}_2(I_{LR\uparrow}, \hat{I}_{REF})$$

where, $V_2^3$, $V_2^2$, $V_2^1$, $V_2^0$ are second optical flow fields obtained for performing the alignment in the feature domain under four scales of down-sampling of 3, 2, 1, 0 respectively, and $I_{LR\uparrow}$, $\hat{I}_{REF}$ are inputs of an optical flow field prediction Flow$_2$ in the second stage.

The encoder-decoder module may be further configured to encode aligned feature maps, for each scale, using an encoder, like the U-Net encoder; and for each scale, synthesize features corresponding to the reference image, features corresponding to the low-resolution target image, and outputs from a previous layer of the encoder on a channel dimension.

In an example, the device 100 may further include a loss function module, configured to determine at least one of alignment error, reconstruction error, and feature point error as a loss function.

It should be noted that the foregoing description of the multi-image-based image enhancement method is also applicable for the multi-image-based image enhancement device according to embodiments, and details are not described herein again.

With the multi-image-based image enhancement device, the neural network is used to estimate the optical flow fields among different inputs from sensors. The optical flow field is used for aligning multi images from sensors and feature maps. The aligned images and aligned feature maps are input into the neural network for reconstruction to obtain the output, thereby having good performance, good visual effect, and high speed, without grid noise. Further, the alignment in the feature domain and the direct supervisory signals allow good convergence effect and good output performance.

Figure 5:
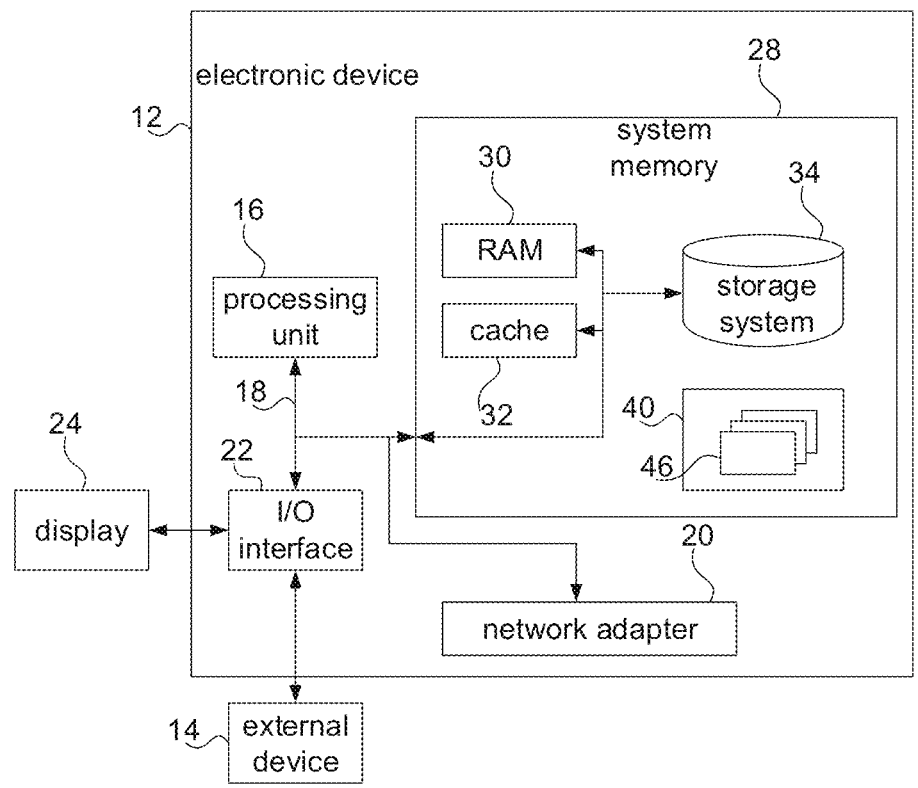
FIG. 5 is a block diagram illustrating an electronic device according to embodiments of the present disclosure.

FIG. 5 is a block diagram illustrating an electronic device according to embodiments of the present disclosure. The electronic device 12 illustrated in FIG. 5 is only illustrated as an example, and should not be considered as any restriction on the function and the usage range of embodiments of the present disclosure.

As illustrated in FIG. 5, the electronic device 12 is in the form of a general-purpose computing apparatus. The electronic device 12 may include, but is not limited to, one or more processors or processing units 16, a system memory 28, and a bus 18 connecting different system components (including the system memory 28 and the processing unit 16).

The bus 18 represents one or more of several types of bus architectures, including a memory bus or a memory control bus, a peripheral bus, a graphic acceleration port (GAP) bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronics standards association (VESA) local bus, and a peripheral component interconnect (PCI) bus.

Typically, the electronic device 12 may include multiple kinds of computer-readable media. These media may be any storage media accessible by the electronic device 12, including transitory or non-transitory storage medium and movable or unmovable storage medium.

The memory 28 may include a computer-readable medium in a form of volatile memory, such as a random access memory (RAM) 30 and/or a high-speed cache memory 32. The electronic device 12 may further include other transitory/non-transitory storage media and movable/unmovable storage media. In way of example only, the storage system 34 may be used to read and write non-removable, non-volatile magnetic media (not shown in the figure, commonly referred to as "hard disk drives"). Although not illustrated in FIG. 5, it may be provided a disk driver for reading and writing movable non-volatile magnetic disks (e.g. "floppy disks"), as well as an optical driver for reading and writing movable non-volatile optical disks (e.g. a compact disc read only memory (CD-ROM, a digital video disc read only Memory (DVD-ROM), or other optical media). In these cases, each driver may be connected to the bus 18 via one or more data medium interfaces. The memory 28 may include at least one program product, which has a set of (for example at least one) program modules configured to perform the functions of embodiments of the present disclosure.

A program/application 40 with a set of (at least one) program modules 42 may be stored in memory 28, the program modules 42 may include, but not limit to, an operating system, one or more application programs, other program modules and program data, and any one or combination of above examples may include an implementation in a network environment. The program modules 42 are generally configured to implement functions and/or methods described in embodiments of the present disclosure.

The electronic device 12 may also communicate with one or more external devices 14 (e.g., a keyboard, a pointing device, a display 24, and etc.) and may also communicate with one or more devices that enables a user to interact with the electronic device 12, and/or any device (e.g., a network card, a modem, and etc.) that enables the electronic device 12 to communicate with one or more other computing devices. This kind of communication can be achieved by the input/output (I/O) interface 22. In addition, the electronic device 12 may be connected to and communicate with one or more networks such as a local area network (LAN), a wide area network (WAN) and/or a public network such as the Internet through a network adapter 20. As illustrated in FIG. 5, the network adapter 20 communicates with other modules of the electronic device 12 over bus 18. It should be understood that although not shown in the figure, other hardware and/or software modules may be used in combination with the electronic device 12, which including, but not limited to, microcode, device drivers, redundant processing units, external disk drive arrays, RAID systems, tape drives, as well as data backup storage systems and the like.

The processing unit 16 can perform various functional applications and data processing by running programs stored in the system memory 28, for example, to perform the multi-image-based image enhancement method according to embodiments of the present disclosure.

Embodiments of the present disclosure provides a computer storage medium.

The computer storage medium of embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A multi-image-based image enhancement method, comprising:
   aligning, with a processor, a low-resolution target image provided by a sensor and a reference image in an image domain to obtain an aligned reference image;
   performing, with the processor, an alignment in a feature domain between down-sampled images of an up-sampled version of the low-resolution target image and an estimation value of the aligned reference image; and
   synthesizing, with an encoder and a decoder, features corresponding to the low-resolution target image and features corresponding to the reference image to generate a final output.

2. The method of claim 1, wherein aligning, with the processor, the low-resolution target image and the reference image in the image domain comprises:
   obtaining a first optical flow field for aligning the low-resolution target image and the reference image.

3. The method of claim 2, wherein obtaining the first optical flow field for aligning the low-resolution target image and the reference image comprises:

obtaining at least two down-sampled target images by down-sampling the low-resolution target image respectively under at least two scales of down-sampling; and for each scale, obtaining the first optical flow field based on the down-sampled target image and the reference image; and for each scale, obtaining an estimation of the reference image based on the first optical flow field.

4. The method of claim 3, wherein performing, with the processor, the alignment in the feature domain comprises:

up-sampling the low-resolution target image to obtain an up-sampled target image;

obtaining at least two down-sampled images by down-sampling the up-sampled target image under at least two scales of down-sampling; and for each scale, obtaining a second optical flow field based on the estimation of the reference image and the down-sampled image of the up-sampled target image.

5. The method of claim 4, wherein performing, with the processor, the alignment in the feature domain comprises:

for each scale, aligning a feature map corresponding to the down-sample image and a feature map corresponding to the reference map based on the second optical flow field.

6. The method according to claim 3, wherein synthesizing, with an encoder and a decoder, features corresponding to the low-resolution target image and features corresponding to the reference image to generate a final output comprises:

for each scale, encoding the feature map aligned using an encoder, the encoder comprising at least two convolution layers; and for each scale, synthesizing, with the decoder, the feature map corresponding to the low-resolution target image, the feature map corresponding to the reference image aligned to the feature map corresponding to the low-resolution target image, and outputs from a previous convolution layer of the encoder on a channel dimension.

7. The method of claim 3, wherein for each scale, obtaining the first optical flow field based on the down-sampled target image and the reference image comprises:

obtaining four first optical flow fields based on a following equation:

$$\{V^3, V^2, V^1, V^0\} = \text{Flow}(I_1, I_2)$$

where, $V^3$, $V^2$, $V^1$, $V^0$ are first optical flow fields obtained under four scales of down-sampling of 3, 2, 1, 0 respectively, $I_1$ is a down-sampled target image under each scale of down-sampling, and $I_2$ is the reference image.

8. The method according to claim 4, wherein for each scale, obtaining a second optical flow field based on the estimation of the reference image and the down-sampled image of the up-sampled target image comprises:

obtaining four second optical flow fields based on a following equation:

$$\{V_2^3, V_2^2, V_2^1, V_2^0\} = \text{Flow}_2(I_{LR\uparrow}, \hat{I}_{REF})$$

where, $V_2^3$, $V_2^2$, $V_2^1$, $V_2^0$ are second optical flow fields obtained under four scales of down-sampling of 3, 2, 1, 0 respectively, $I_{LR\uparrow}$ is the down-sampled image of the up-sampled target image under each scale of down-sampling, and $\hat{I}_{REF}$ is the estimation of the reference image.

9. The method according to claim 1, further comprising: determining at least one of alignment error, reconstruction error, and feature point error as a loss function.

10. An electronic device, comprising:

a processor, a memory, having one or more computer programs stored thereon, when the one or more computer programs are executed by the processor, the processor is configured to:

align a low-resolution target image provided by a sensor and a reference image in an image domain to obtain an aligned reference image;

perform an alignment in a feature domain between down-sampled images of an up-sampled version of the low-resolution target image and an estimation value of the aligned reference image; and synthesize features corresponding to the low-resolution target image and features corresponding to the reference image to generate a final output.

11. The electronic device of claim 10, wherein the processor is configured to align the low-resolution target image and the reference image in the image domain by:

obtaining a first optical flow field for aligning the low-resolution target image and the reference image.

12. The electronic device of claim 11, wherein the processor is configured to obtain the first optical flow field for aligning the low-resolution target image and the reference image by:

obtaining at least two down-sampled target images by down-sampling the low-resolution target image respectively under at least two scales of down-sampling; and for each scale, obtaining the first optical flow field based on the down-sampled target image and the reference image; and for each scale, obtaining an estimation of the reference image based on the first optical flow field.

13. The electronic device of claim 12, wherein the processor is configured to perform the alignment in the feature domain by:

up-sampling the low-resolution target image to obtain an up-sampled target image;

obtaining at least two down-sampled images by down-sampling the up-sampled target image under at least two scales of down-sampling; and for each scale, obtaining a second optical flow field based on the estimation of the reference image and the down-sampled image of the up-sampled target image.

14. The electronic device of claim 13, wherein the processor is configured to:

for each scale, aligning a feature map corresponding to the down-sample image and a feature map corresponding to the reference map based on the second optical flow field.

15. The electronic device of claim 12, wherein the processor is configured to synthesize features corresponding to the low-resolution target image and features corresponding to the reference image to generate a final output by:

for each scale, encoding the feature map aligned using an encoder, the encoder comprising at least two convolution layers; and for each scale, synthesizing, with the decoder, the feature map corresponding to the low-resolution target image, the feature map corresponding to the reference image aligned to the feature map corresponding to the low-resolution target image, and outputs from a previous convolution layer of the encoder on a channel dimension.

16. The electronic device of claim 12, wherein the processor is configured to, for each scale, obtain the first optical flow field based on the down-sampled target image and the reference image by:
obtaining four first optical flow fields based on a following equation:

$$\{V^3, V^2, V^1, V^0\} = \mathrm{Flow}(I_1, I_2)$$

where, $V^3$, $V^2$, $V^1$, $V^0$ are first optical flow fields obtained under four scales of down-sampling of 3, 2, 1, 0 respectively, $I_1$ is a down-sampled target image under each scale of down-sampling, and $I_2$ is the reference image.

17. The electronic device of claim 13, wherein the processor is configured to, for each scale, obtain a second optical flow field based on the estimation of the reference image and the down-sampled image of the up-sampled target image by:
obtaining four second optical flow fields based on a following equation:

$$\{V_2^3, V_2^2, V_2^1, V_2^0\} = \mathrm{Flow}_2(I_{LR\uparrow}, \tilde{I}_{REF})$$

where, $V_2^3$, $V_2^2$, $V_2^1$, $V_2^0$ are second optical flow fields obtained under four scales of down-sampling of 3, 2, 1, 0 respectively, $I_{LR\uparrow}$ is the down-sampled image of the up-sampled target image under each scale of down-sampling, and $\tilde{I}_{REF}$ is the estimation of the reference image.

18. The electronic device of claim 10, wherein the processor is further configured to:
determine at least one of alignment error, reconstruction error, and feature point error as a loss function.

19. A non-transitory computer readable storage medium, having one or more computer programs stored thereon, wherein when the one or more computer programs are executed by a processor, a multi-image-based image enhancement method is executed, the method comprising:
aligning, with a processor, a low-resolution target image provided by a sensor and a reference image in an image domain to obtain an aligned reference image;
performing, with the processor, an alignment in a feature domain between down-sampled images of an up-sampled version of the low-resolution target image and an estimation value of the aligned reference image; and
synthesizing, with an encoder and a decoder, features corresponding to the low-resolution target image and features corresponding to the reference image to generate a final output.

* * * * *